May 31, 1960 W. E. SEHN 2,938,245
WEATHER SEALING MEMBER STRUCTURE
Filed Sept. 24, 1956 2 Sheets-Sheet 1
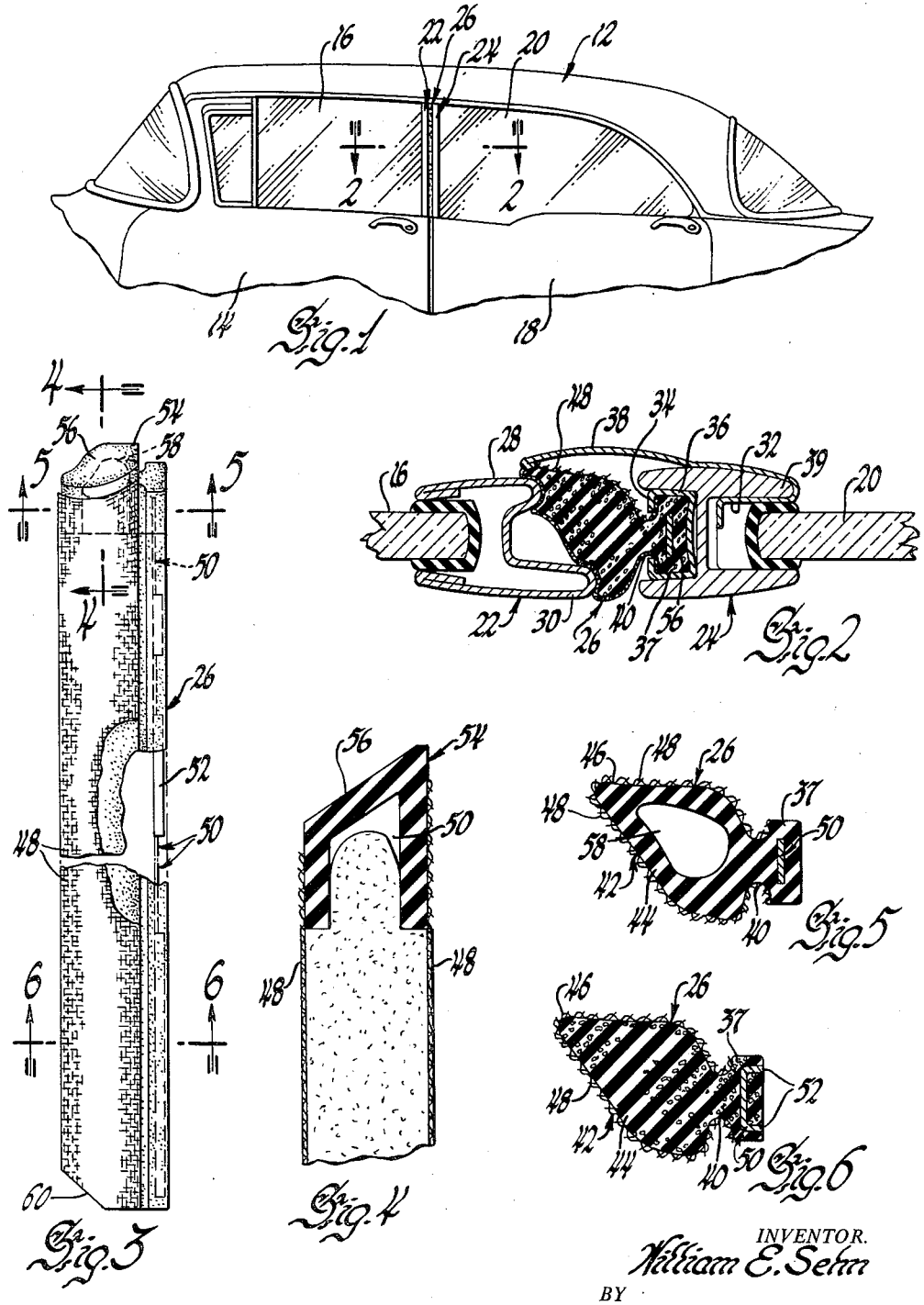
INVENTOR.
William E. Sehn
BY
W. C. Middleton
ATTORNEY

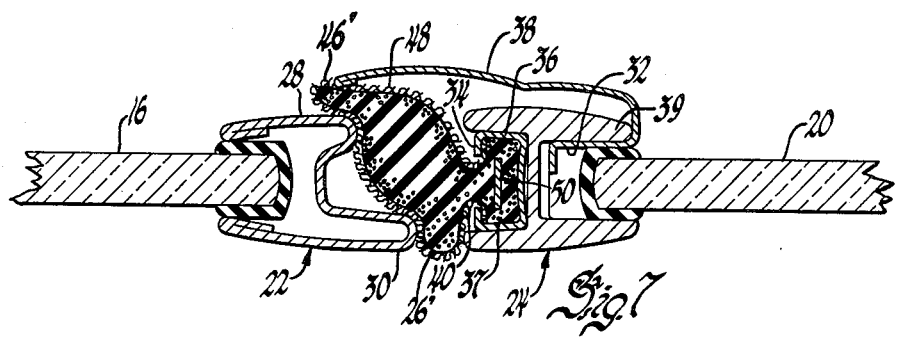
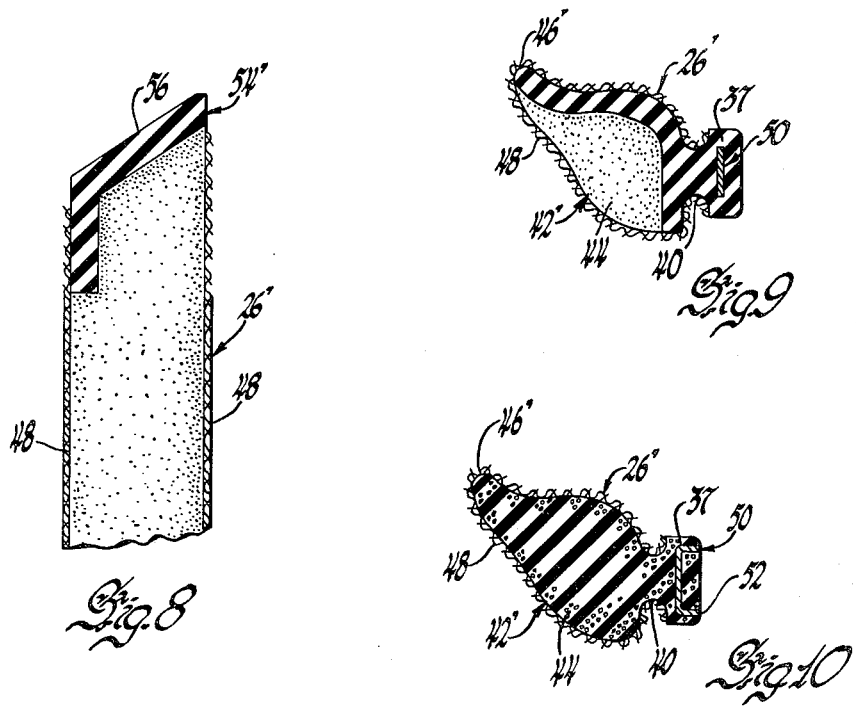

United States Patent Office 2,938,245
Patented May 31, 1960

2,938,245

WEATHER SEALING MEMBER STRUCTURE

William E. Sehn, Highland Park, Mich., assignor to General Motors Corporation, Detroit, Mich., a corporation of Delaware Filed Sept. 24, 1956, Ser. No. 611,448

11 Claims. (Cl. 20—16)

This invention relates to weather sealing members for closures and particularly to weather sealing members for vehicle bodies.

With the introduction of vehicle bodies omitting the side pillar or supporting post, e.g., bodies of the two-door and four-door hardtop types, a problem is presented of providing an adequate weather sealing member in the area between the front and rear windows, formerly occupied by this pillar. This sealing member must at one end sealingly engage a roof portion of the body as well as prevent leakage between the windows when closed. These problems have to be considered while keeping in mind the fact that each of the related closures may be moved independently encouraging possible misalignments.

The present invention seeks in overcoming these problems as a main object to provide a novel weather sealing strip with related structure which together provide a more effective seal between independently movable closures. These related structures are especially suited for obtaining a more effective seal despite possible misalignments.

The invention further contemplates the provision of a sealing member that is durable; that is, resilient while still having the required rigidity for an effective seal; and that has one end adapted to provide a sealing surface.

Specifically, the sealing member has cover means for the resilient material to increase the wear qualities, improve appearance, and eliminate rubbing noises. Also, re-enforcing means are included to render the material more rigid.

The foregoing and other objects and advantages of the invention will be apparent from the following description and from the accompanying drawings in which:

Figure 1 is a side view of a vehicle body with which the invention may be used.

Figure 2 is an enlarged sectional view along the lines 2—2 of Figure 1.

Figure 3 is a view of the weather sealing member.

Figure 4 is an enlarged partial sectional view along the lines 4—4 of Figure 3.

Figures 5 and 6 are sections along lines 5—5 and 6—6, respectively, of Figure 3.

Figure 7 is an enlarged sectional view of a modification of Figure 2.

Figures 8, 9 and 10 are sections similar to Figures 4, 5 and 6 of a modification.

In Figure 1 a vehicle body 12 of the four-door hardtop type is depicted which embodies the present invention. This body includes a front door 14 with a window 16 and a rear door 18 with a window 20. Both doors are swingably mounted on the body with each door hinged at the front end. Each of the windows 16 and 20 are enclosed in frames with the front window having a rear frame member 22 and the rear window having a front frame member 24 between which is disposed a sealing strip or sealing member 26.

Referring to Figure 2, the details of these frame members 22 and 24 and the sealing member 26 are demonstrated with the windows and doors in the closed positions. The frame member 22 includes an inboard leg 28 and an outboard leg 30 with the outboard leg 30 projecting longitudinally of the body a greater distance than the inboard leg 28. As shown, the adjacent frame member 24 for the rear window 20 is of H-shape and includes a rear channel 32 and a front channel 34. The front channel 34 snugly receives for movement therewith a weather strip retainer 36 which attaches to a base portion 37 of the sealing member 26. To conceal seal member 26 from view inside the vehicle, a molding 38 is clamped around an inboard arm 39 of the frame member 24 adjacent the window 20 and extends longitudinally forwardly over the sealing member 26. Molding 38 also is adapted to carry away any leakage between the inboard leg 28 and the sealing member 26, consequently, providing additional insurance against leakage to the interior of the body. Therefore, leakage past the outboard leg 30 is carried away by the drain trough formed between legs 28 and 30 and leakage around the sealing member 26, particularly at the vehicle roof portion, is carried away by the drain trough afforded by the molding 38.

With the sealing member 26 in the stressed Figure 2 position, it can be seen that a sealing engagement is effected between the sealing member 26 and the round terminal ends of both the inboard leg 28 and the outboard leg 30 of the frame member 22. Since the sealing member 26 is clamped within the channel 34 of the frame member 24, this seal member will move with the rear window 20 when it is opened and closed and also, with the rear door 18 when it is opened and closed. Similarly, with the frame member 22 clampingly attached to the window 16, the inboard and outboard legs 28 and 30 will move out of sealing engagement with the sealing member 26 whenever the front window 16 is opened or is moved relative to the rear window 20 either by opening or closing of front window 16 or the door 14. Also, as can be seen by referring to Figures 1 and 2, during initial movement of the doors 14 and 18, the sealing surface on the sealing member 26 and the terminal ends of the legs 28 and 30 are so arranged as to produce a wiping action from the sliding between these surfaces.

The construction of the sealing member 26 can best be described with reference to Figures 3, 4, 5 and 6. In cross-section, as in Figure 6, the sealing member 26 comprises in addition to the aforementioned rectangular-shaped base portion, a neck portion 40 which receives the inturned ends of the weather strip retainer 36 for clamping thereto and a body section 42 somewhat pear-shaped with an enlarged body portion 44 terminating in a tapered end 46. The tapered end 46 is normally biased inboard, when unstressed, to ensure that this end moves past the inboard leg 28 of the frame member 22 without catching and hanging-up on the inboard side. This is especially important when the rear door 18 is being closed with the front door 14 already closed. This sealing member is an elongated strip of resilient material, preferably relatively inexpensive sponge rubber or an equivalent. To the surface of the body section 42 a cover means such as cloth fabric 48 is cemented or otherwise secured over a skin which prevents absorption of water by the porous sponge rubber. By employing this cloth fabric a better sliding surface is obtained in addition to increasing both the firmness of the sponge rubber and the wear life of the sealing member. Noise due to rubbing is eliminated and the appearance of the seal is improved.

To stiffen and increase the rigidity o fthe sealing member 28, either a re-enforcing metal strip 50 may be embedded in the base portion 37 of the sealing member, as illustrated, or this base portion may be made of a relatively hard mechanical rubber material. This re-enforcing strip 50 has laterally extending flanges 52 intermittently spaced along the strip 50 as depicted in Figures 3 and 6. These flanges aid in the retention of the strip within the sponge rubber material by allowing the material to flow around each of the flanges and provide better adhesion thereto.

At the upper end of the sealing member 26 a cap 54 is bonded to the sponge rubber portion of the sealing member and additionally retained by the cloth fabric 48. This cap 54 includes an oblique wall 56 which seals against a portion of the roof of the body 12, e.g., a roof rail seal (not shown). The oblique wall 56 faces inwardly; that is, toward the inboard side, when the sealing member engages the adjacent roof portion. A bore 58 is provided in the cap 54 to permit vertical flow due to the resiliency of the sponge rubber when it is stressed. Also, during the bonding operation, the sponge rubber can flow into bore 58 and adhere to the surrounding bore surfaces, consequently, aiding in retention of cap 54 to the sponge rubber portion and providing a softer cap. Preferably, the cap 54 is constructed of mechanical rubber to provide a more effective seal. If this terminal portion of the weather strip were of sponge rubber, it would deform upon engagement with the roof portion so as to be bent outwardly of the body without actually entering into sealing engagement with this roof portion.

The bottom of sealing member 26 is suitably relieved as at 60 to prevent interference with closing of the front window 16 after the rear window 20 has been previously closed. Otherwise, the top edge of the frame member 22 might damage the sealing member 26 in this area.

In Figures 7, 8, 9 and 10 a sealing member 26′ of slightly modified contour and with a different type cap is demonstrated. The end 46′ of the sealing member 26′ is somewhat longer than the end 46 of the sealing member 26 and is biased inboard by the rubber formation to, when deformed or stressed, as shown in Figure 7, extend further around the inboard side of the inboard leg 28 of frame member 22 for additional sealing area. Also, the body section 42′ is somewhat enlarged to better fill the gap between the frame members 22 and 24 at the outboard side. The cap 54′ has been modified so as not to completely enclose the sponge rubber as with the cap 54 which included the bore 58, the purpose being both to provide a bias to the cap in a sealing direction and to allow vertical flow of the rubber for reasons mentioned before with relation to cap 54 as well as during stressing to incease this bias.

I claim:

1. In combination, closure members independently movable to and from closed positions, one of said closure members having substantially parallel extending flanges defining a drain channel adjacent to the other of said closure members, each of said flanges being provided with arcuate edges, an elongated weather sealing member of resilient material having a base section secured to said other of said closure members, and a body section extending from said base section and including an enlarged portion terminating in a tapered end, one side of said body section engaging the edges of each of said flanges so as to be compressed thereby and form a sealing engagement therewith, and a molding element attached to one of said closure members to conceal said sealing member when the closure members are in the closed positions and to provide a drain trough.

2. In combination, closure members independently movable to and from closed positions, one of said closure members having substantially parallel extending flanges defining a channel adjacent to the other of said closure members, each of said flanges being provided with arcuate edges, an elongated weather sealing member of resilient material having a base section secured to said other of said closure members, a body section extending from said base section including an enlarged portion terminating in a tapered end, one side of said body section in the closed positions of said closure members engaging the edges of each of said flanges so as to be compressed thereby and form a sealing engagement therewith, cover means for said body section, and a sealing surface on one end of said elongated sealing member.

3. In combination, closure members independently movable to and from closed positions, one of said closure members having substantially parallel extending flanges defining a channel adjacent to the other of said closure members, each of said flanges being provided with arcuate edges; an elongated sealing member of resilient material having a base section secured to said other of said closure members, a body section extending from said base section including an elongated portion terminating in a tapered end, a side of said body section engaging the edges of each of said flanges when the closure members are in the closed position so as to be compressed thereby and form a sealing engagement therewith, cover means for said body section, a re-enforcing member embedded in said base portion and having spaced substantially laterally extending legs to aid the retention of said embedded re-enforcing member within the resilient material of said elongated strip, and a sealing surface on one end of said sealing member.

4. In a vehicle body having an opening therein, a pair of doors mounted on the body for independent swingable movement to and from closed positions relative to the opening, each of the doors including adjacent windows arranged to be raised to and lowered from closed positions, a first frame member connected to one window for movement therewith, an elongated weather sealing strip of resilient compressible material having a base section secured to said first frame member, and a body section extending from said base section including an enlarged sealing portion terminating in a tapered end, a second frame member secured to the other of said windows for movement therewith and including extending inboard and outboard flanges defining a channel adjacent to said first frame member, said tapered end of said sealing strip being biased inboard so as to avoid interfering with said inboard flange when said doors are moved to the closed positions, said sealing portion of said sealing strip engaging the edges of each of said flanges so as to compressed thereby and form a sealing engagement therewith when said windows and doors are in the closed position, said channel defined by said extending flanges coacting with said sealing strip so as to afford a drain trough for leakage when said windows and doors are in the closed positions, said extending flanges on said second frame member and the sealing portion of said sealing strip being so arranged as to produce a wiping action therebetween upon swinging movement of said doors.

5. In a vehicle body having an opening therein and including a roof rail portion along the upper side of the opening, a pair of doors mounted on the body for independent swingable movement to and from closed positions relative to the opening, each of the doors including adjacent windows arranged to be raised to and lowered from the closed positions, a first frame member connected to one window for movement therewith, an elongated weather sealing strip of resilient compressible material having a base section secured to said first frame member, a body section extending from said base section including an enlarged sealing portion terminating in a tapered end, a second frame member secured to the other of said windows for movement therewith and including extending flanges defining a channel adjacent to said first frame member, said sealing portion of said sealing strip engaging the edges of each said flanges so as to be compressed thereby and form a sealing engagement therewith when said windows and doors are in the closed positions, and a sealing element joined to an upper end of said sealing strip and provided with a sealing surface for sealing engagement with the roof rail portion of said vehicle body, said extending flanges on said second frame member and the sealing portion of said sealing strip being so arranged as to produce a wiping action therebetween upon swinging movement of said doors.

6. In a vehicle body having an opening therein and including a roof rail portion along the upper side of the opening, a pair of doors mounted on the body for independent swingable movement to and from closed positions relative to the opening, each door including adjacent windows arranged to be raised to and lowered from closed positions, a first frame member connected to one of said windows for movement therewith and having extending flanges adjacent to the other window of said windows, a second frame member having a pair of channels with the other of said windows being secured within one of said channels for movement therewith, an elongated weather sealing strip of resilient compressible material having a base section secured within the other channel of said second frame member, a body section extending from said base section including an enlarged sealing portion terminating in a tapered end, cover means for said body sealing section, said sealing portion of said sealing strip engaging the edges of each of said flanges so as to be compressed thereby and form a sealing engagement therewith when said windows and doors are in the closed positions, and a sealing surface on an upper end of said sealing strip for sealing engagement with the roof rail portion of said vehicle body, said extending flanges on said second frame member and the sealing portion of said sealing strip being so arranged as to produce a wiping action therebetween upon swinging movement of said doors.

7. In a vehicle body having an opening therein and including a roof rail portion along the upper side of the opening, a pair of doors mounted on the body for independent swingable movement to and from closed positions relative to the opening, each door including adjacent windows arranged to be raised to and lowered from closed positions, a first frame member connected to one of said windows for movement therewith and having extending flanges adjacent to the other of said windows, a second frame member having a pair of channels with the other of said windows being secured within one of said channels for movement therewith, an elongated weather sealing strip of resilient compressible material having a base section secured within the other of said channels of said second frame member, a body section extending from said base section including an enlarged sealing portion terminating in a tapered end, cover means for said body sealing section, a re-enforcing member embedded in said base portion and having spaced substantially laterally extending legs to aid the retention of said embedded re-enforcing member within the resilient material of said elongated sealing strip, said sealing portion of said sealing strip engaging the edges of each of said flanges so as to be compressed thereby and form a sealing engagement therewith when said windows and doors are in the closed positions, and a sealing element joined to an upper end of said sealing strip provided with an oblique sealing surface for sealing engagement with the roof rail portion of said vehicle body, said extending flanges on said second frame member and the sealing portion of said sealing strip being so arranged as to produce a wiping action therebetween upon swinging movement of said doors.

8. In a vehicle body having an opening therein, a pair of doors mounted on the body for independent swingable movement to and from closed positions relative to the body, each door including adjacent windows arranged to be raised to and lowered from closed positions, a first frame member connected to one of said windows for movement therewith and having extending inboard and outboard flanges adjacent to the other window of said windows, a second frame member having a pair of channels with the other of said windows being secured within one of said channels for movement therewith, an elongated weather sealing strip of resilient compressible material having a base section secured within the other channel of said second frame member, a body section extending from said base section including an enlarged sealing portion terminating in a tapered end, cover means for said body sealing section, said sealing portion of said sealing strip engaging the edges of each of said flanges so as to be compressed thereby and form a sealing engagement therewith when said windows and doors are in the closed positions, and means urging said body section into sealing engagement with said inboard flange, said extending flanges on said second frame member and the sealing portion of said sealing strip being so arranged as to produce a wiping action therebetween upon swinging movement of said doors.

9. In a vehicle body, a pair of doors including adjacent movable windows for each door, a first frame member connected to one window for movement therewith, an elongated weather sealing strip of resilient material having a base section secured to said first frame member, a body section extending from said base section including an enlarged sealing portion terminating in a tapered end, a second frame member secured to the other of said windows for movement therewith and including extending flanges defining a channel adjacent to said first frame member, said sealing portion of said sealing strip engaging said flanges in sealing relation when said windows and doors are in the closed positions, and a sealing element joined to an upper end of said sealing strip and provided with a sealing surface arranged for sealing engagement with a roof portion of said vehicle body, and means biasing said sealing surface into sealing engagement with said roof portion, said extending flanges on said second frame member and the sealing portion of said sealing strip being so arranged as to produce a wiping action therebetween upon swinging movement of said doors.

10. In combination, closure members independently swingable to and from closed positions, one of the closure members having substantially parallel extending outboard and inboard flanges defining a channel adjacent to the other of said closure members and having arcuate ends, the outboard flange extending beyond the inboard flange, an elongated weather sealing member of resilient compressible material having a base section secured to said other of said closure members, and a body section extending from said base section and including an enlarged portion terminating in a tapered end, one side of said body section providing an inclined sealing surface for engaging in the closed positions of said closure members the arcuate ends of each of said flanges so as to be compressed thereby and form a sealing engagement therewith, the plane formed by the extending flanges being substantially coincident with the plane of the inclined sealing surface.

11. In a vehicle body having an opening therein, a pair of doors mounted on the body for independent swingable movement to and from closed positions relative to the opening, each of the doors including adjacent windows arranged to be raised to and lowered from closed positions, a first frame member connected to one window for movement therewith, and an elongated weather sealing strip of resilient compressible material having a base section secured to said first frame member and a body section extending from said base section including an enlarged sealing portion termianting in a tapered end, a second frame member secured to the other of said windows for movement therewith and including extending outboard and inboard flanges defining a channel adjacent to said first frame member, said tapered end of said sealing strip being biased inboard so as to avoid interfering with said inboard flange when said doors are moved to the closed positions, said sealing portion of said sealing strip being inclined to provide a sealing surface for engaging the edges of each of the said flanges so as to be compressed thereby and form a sealing engagement therewith when said windows and doors are in the closed positions, the plane formed by the extending flanges being substantially coincident with the plane of the inclined sealing surface, the outboard and inboard flanges and the sealing surface on the sealing member being so arranged as to produce a wiping action therebetween upon swinging movement of the doors.

References Cited in the file of this patent

UNITED STATES PATENTS

| | | |
|---|---|---|
| 1,015,252 | Towle | Jan. 16, 1912 |
| 1,800,008 | Cronmiller et al. | Apr. 7, 1931 |
| 1,854,032 | Holt et al. | Apr. 12, 1932 |
| 2,029,050 | Birge | Jan. 28, 1936 |
| 2,258,996 | Morrison | Oct. 14, 1941 |
| 2,344,575 | Warren | Mar. 21, 1944 |
| 2,474,985 | Rivard et al. | July 5, 1949 |
| 2,498,852 | Doty | Feb. 28, 1950 |
| 2,593,305 | Hunter | Apr. 15, 1952 |
| 2,611,937 | Kendrick | Sept. 30, 1952 |
| 2,687,914 | Schrum | Aug. 31, 1954 |
| 2,724,877 | Ramsay | Nov. 29, 1955 |
| 2,737,412 | Smith et al. | Mar. 6, 1956 |
| 2,797,958 | Podolan | July 2, 1957 |

FOREIGN PATENTS

| | | |
|---|---|---|
| 419,740 | Great Britain | Nov. 19, 1934 |
| 675,687 | Great Britain | July 16, 1952 |